(12) United States Patent
Zami et al.

(10) Patent No.: US 7,536,103 B2
(45) Date of Patent: May 19, 2009

(54) RECONFIGURABLE OPTICAL SWITCHING SYSTEM

(75) Inventors: Thierry Zami, Massy (FR); Amaury Jourdan, Sevres (FR); Richard Douville, Longpont sur Orge (FR)

(73) Assignee: Alcatel, Paris (FR)

( * ) Notice: Subject to any disclaimer, the term of this patent is extended or adjusted under 35 U.S.C. 154(b) by 402 days.

(21) Appl. No.: 11/226,346

(22) Filed: Sep. 15, 2005

(65) Prior Publication Data

US 2006/0062575 A1 Mar. 23, 2006

(30) Foreign Application Priority Data

Sep. 17, 2004 (FR) .................................. 04 52078

(51) Int. Cl.
*H04J 14/00* (2006.01)
(52) U.S. Cl. .......................................... 398/49; 398/50
(58) Field of Classification Search .................... 398/48, 398/49, 50
See application file for complete search history.

(56) References Cited

U.S. PATENT DOCUMENTS

| 5,191,626 | A | * | 3/1993 | Stern ............................ 385/24 |
| 5,889,600 | A | * | 3/1999 | McGuire ..................... 398/50 |
| 6,414,766 | B1 | | 7/2002 | Vinel |

| 2002/0021467 | A1 | | 2/2002 | Ofek |
| 2002/0071157 | A1 | * | 6/2002 | Sauze et al. ................. 359/128 |

FOREIGN PATENT DOCUMENTS

| EP | 0 711 903 A1 | 5/1996 |
| EP | 1 054 572 A2 | 11/2000 |

OTHER PUBLICATIONS

T. Ducellier et al, "The MWS 1x4: A High Performance Wavelength Switching Building Block", ECOC 2002, 285h European Conference on Optical Communication, Copenhagen, Denmark, Sep. 8-12, 2002, European Conference on Optical Communication (ECOC), vol. 1 of 4, Conf. 28, Sep. 9, 2002, p. 231, XP001158349.

* cited by examiner

*Primary Examiner*—Nathan M Curs
(74) *Attorney, Agent, or Firm*—Sughrue Mion, PLLC

(57) ABSTRACT

The switching system comprises a routing device having selection modules each having one input and a plurality of outputs adapted to switch spectral channels received selectively to respective outputs as a function of a command. The routing device comprises a first stage comprising a plurality of modules whose inputs constitute the input ports of the device, a second stage comprising at least one first selection module whose outputs constitute the output ports of the device, and an intermediate stage for coupling the input of the first selection module of the second stage both to a first output of a first selection module of the first stage and to a first output of a second selection module of the first stage. The switching system applies to interconnection panels in switching nodes for optical networks.

11 Claims, 2 Drawing Sheets

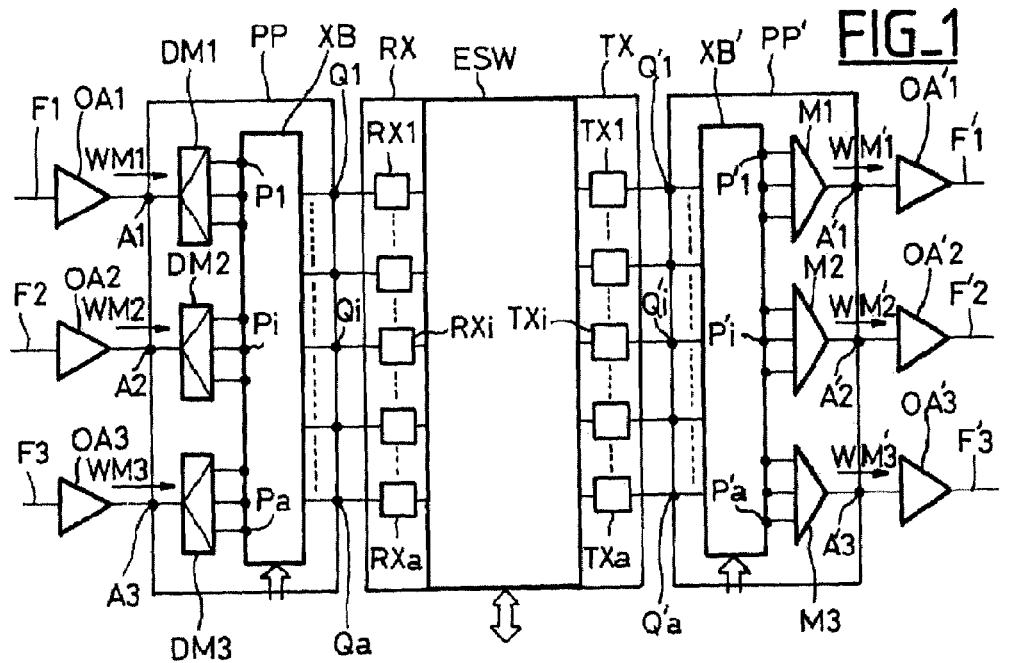
FIG_1 RELATED ART
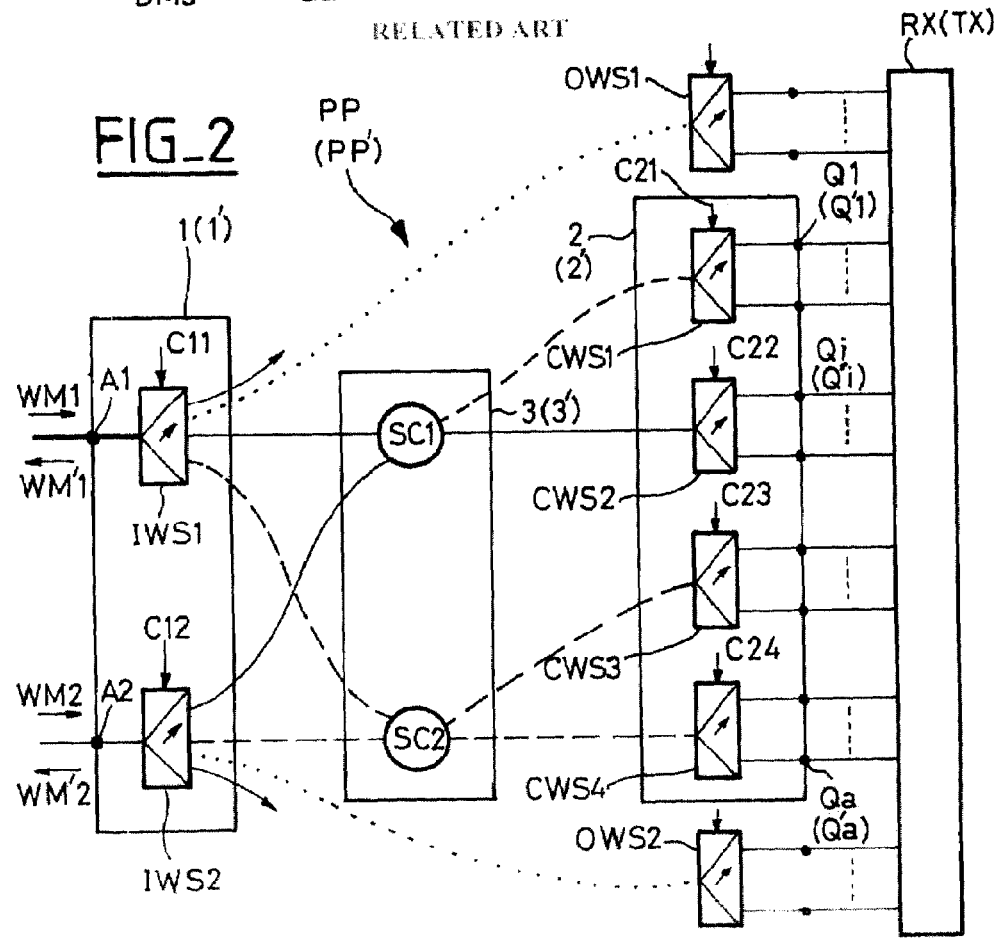
FIG_2

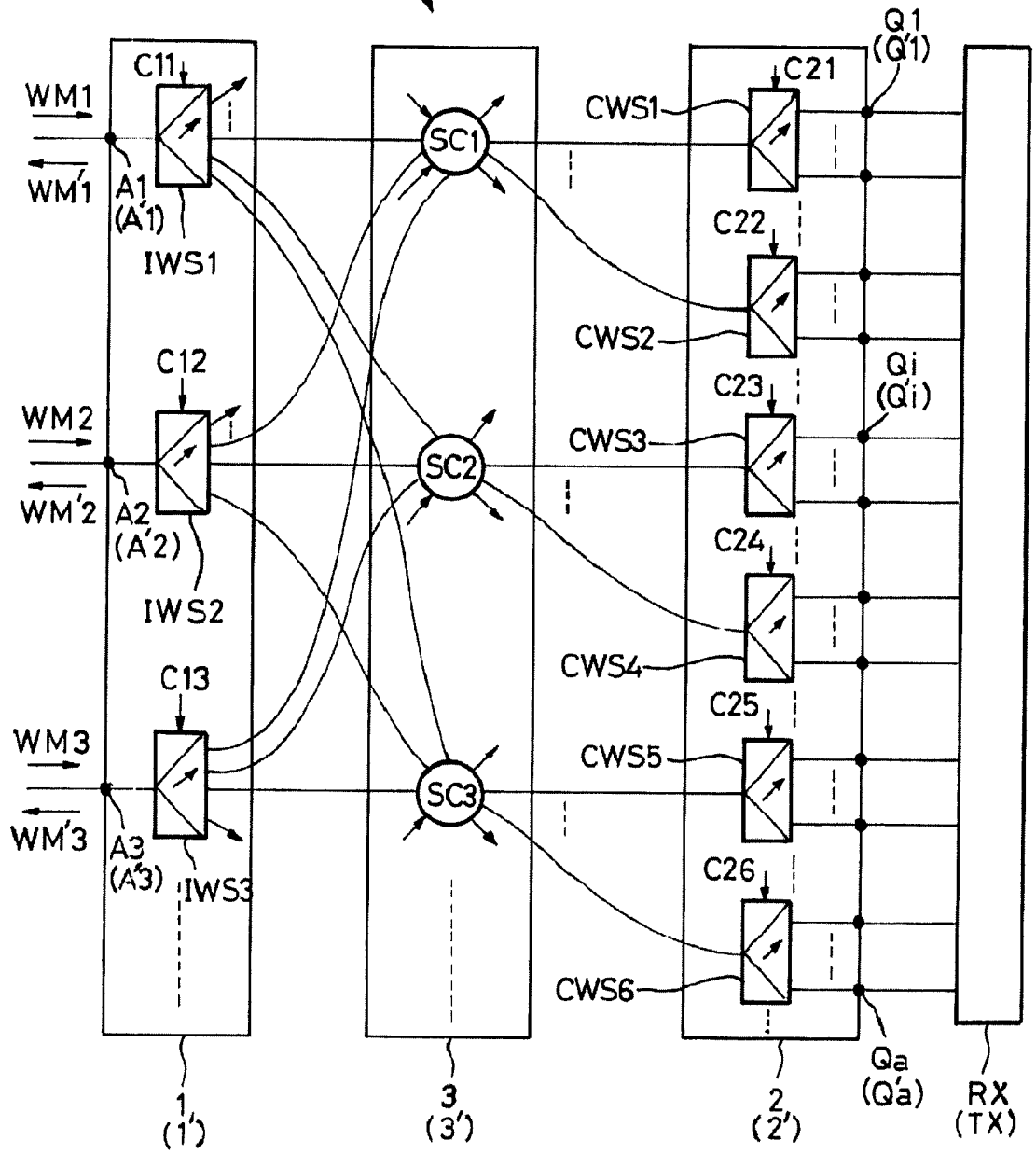

RECONFIGURABLE OPTICAL SWITCHING SYSTEM

CROSS-REFERENCE TO RELATED APPLICATIONS

This application is based on French Patent Application No. 0452078 filed 17 Sep. 2004, the disclosure of which is hereby incorporated by reference thereto in its entirety, and the priority of which is hereby claimed under 35 U.S.C. §119.

BACKGROUND OF THE INVENTION

1. Field of the Invention

The field of the invention is that of wavelength division multiplex optical transmission networks. The invention relates to optical switching systems for use in the routing nodes of such networks.

The invention relates more particularly to reconfigurable optical switches which receive via their input ports a plurality of wavelength division multiplex (WDM) signals and individually route the spectral channels (or, to put it more simply, wavelengths) constituting the WDM signals received to respective output ports selected as a function of a command. The invention also relates to switches adapted to perform the converse operation, i.e. to form at their output ports, from received single-wavelength signals, a plurality of WDM signals each consisting of a combination of the received single-wavelength signals selected as a function of a command.

The switches considered here are transparent, i.e. of the type in which the channels remain in the optical domain.

2. Description of the Prior Art

Switches of the above type are advantageously used in the routing nodes as reconfigurable input or output interfaces of electronic switches.

An interface of the above kind is generally called a patch panel in English. The input patch panel spatially separates the WDM channels received from a plurality of input optical fibers and switches all of those channels to respective output ports. The output ports communicate with respective input terminals of an electronic switch via an optical-to-electrical conversion interface consisting of optical receivers, typically photodetectors.

The output patch panel includes input ports that communicate with respective output ports of the electronic switch via an electrical-to-optical conversion interface consisting of single-wavelength optical signal senders, typically modulated laser sources. These signals are formed into WDM signal channels by the output patch panel, which switches the sent single-wavelength signals and combines them in groups to form multiplexes at respective output ports. The output ports are coupled to respective output optical fibers.

For optimum use of the spectral resources in a network it is desirable for the patch panels to provide some flexibility, i.e. for them to be at least partly reconfigurable by means of a simple command. This is because, considering the input patch panel first, it is clear that the maximum number of received channels that can be processed by a node is imposed by the number of input terminals of the electronic switch (or at least the number thereof in service at a given time). This causes the same limitation on the number of channels that may be used simultaneously in all of the fibers of the network on the upstream side of the node. Now, to make good use of these limited resources, it is necessary to be able to modify their distribution between the fibers, i.e. to be able to reduce the number of channels assigned to a fiber on which traffic is decreasing to the benefit of another fiber on which the traffic is tending to become saturated.

This implies that at least one of the receivers that initially receives a certain channel coming from a certain fiber may thereafter receive instead a channel additionally assigned to another fiber and coming therefrom. With a non-reconfigurable patch panel, such redistribution of channels between the fibers is not possible without physical manipulation of elements of the panel by a technician.

There is a similar requirement in respect of the output patch panel. Here the maximum number of channels that can be sent is imposed by the number of active output channels of the electronic switch (which is generally the same as the number of input terminals). As the output fibers generally correspond to different destinations and each carry traffic that can evolve significantly, it is also necessary to be able to modify by means of a simple command the numbers of channels injected into the respective output fibers.

One prior art solution providing the above function is shown diagrammatically in FIG. 1, which relates to the particular case of a routing node coupled to three input optical fibers and three output optical fibers. The diagram shows the elements relating to a routing node that have just been referred to, in succession:

- input optical fibers F1-F3 that carry respective input multiplexes WM1-WM3 via input optical amplifiers OA1-OA3;
- an input patch panel PP having input ports A1-A3 coupled to respective outputs of the amplifiers OA1-OA3 and output ports Q1, . . . Qi, . . . Qa;
- an optical-to-electrical conversion interface RX consisting of optical receivers RX1, . . . RXi, . . . RXa coupled to respective output ports Q1, . . . Qi, . . . Qa of the patch panel PP;
- an electronic switch ESW;
- an electrical-to-optical conversion interface TX consisting of optical senders TX1, . . . TXi, . . . TXa (in the particular but usual case in which the numbers of receivers and senders are equal);
- an output patch panel PP' having input ports Q'1, . . . Q'i, . . . Q'a coupled to respective outputs of the senders TX1, . . . TXi, . . . TXa and output ports A'1-A'3; and
- output optical fibers F'1-F'3 that receive output multiplexes WM'1-WM'3 from the output ports A'1-A'3 via output optical amplifiers OA'1-OA'3 whose inputs are coupled to respective output ports A'1-A'3.

To provide the required flexibility on the upstream side of the node, the input patch panel PP uses a first stage consisting of optical demultiplexers DM1-DM3 coupled to respective input fibers followed by a space switch XB. With conventional demultiplexers, i.e. demultiplexers each adapted to provide at its outputs the various channels constituting the multiplex that it receives, the maximum flexibility is obtained if the space switch XB is a crossbar switch enabling selective coupling of each output P1, . . . Pi, . . . Pa of the demultiplexer to any of its output ports Q1, . . . Qi, . . . Qa as a function of a command (no reference number). Partial flexibility may also be provided by using a smaller space switch receiving only some of the channels separated by the demultiplexers, the other channels being guided directly to respective dedicated receivers.

In the same way, to provide the required flexibility on the downstream side of the node, the output patch panel PP' uses a space switch XB' followed by a second stage consisting of optical couplers M1-M3 coupled to respective output fibers. The maximum flexibility is also obtained if the space switch XB' is a crossbar switch allowing selective coupling of each sender output from its input ports Q'1, ... Q'i, ... Q'a to any one of the inputs P'1, ... P'i, ... P'a of the couplers M1-M3. Partial flexibility may also be provided by using a smaller space switch receiving the signals from only some of the senders, the other signals being guided directly to respective couplers.

The drawback of the above solution is its lack of modularity. A network node is adapted to achieve a given nominal switching capacity, but when the network first begins to function not all of that capacity is used. As requirements increase, upgrading is effected by using new wavelengths in the fibers initially used and/or new fibers. The non-modular character of the arrangement makes it obligatory either to install from the outset of operation a space switch rated for the nominal capacity, but therefore overrated for the initial requirement, or to accept a degraded level of flexibility when the capacity increases. On the other hand, it is desirable to adapt the cost and the performance of the above kind of equipment continuously to the commercial use that is made of it.

The invention seeks to remedy this drawback by proposing a new optical switch structure that may be used as reconfigurable input and output patch panels and which is modular so that its performance may evolve in proportion to its cost, the expression "performance" here designating its capacity to process a certain number of channels accepted as input for a certain number of fibers without degrading flexibility, i.e. the ratio of the number of channels that can be reassigned between fibers to the average number of channels conveyed by each fiber.

To this end, the invention uses as a basic building block an optical component known as a wavelength selection switch or a wavelength switch module available from various suppliers. A component of the above kind was described, for example, at the ECOC'2002 conference, Copenhagen, 9 Sep. 2002, document 2.3.1, entitled "The MWS 1×4: A High Performance Wavelength Switching Building Block", by T. Ducellier et al.

The above component may be used to effect demultiplexing or multiplexing according to the signal propagation direction. In the former case, one port of the component constitutes an input and several other ports constitute outputs. The component switches spectral channels of a multiplex received at its input to respective outputs of the module selectively as a function of their respective wavelengths and as a function of a command signal.

This component therefore has a programmable demultiplexing function supplying at any selected output either a selected channel from the channels of the received multiplex or an output multiplex consisting of a set of channels selected from the channels of the received multiplex. It has the particular feature of being able to process a large number of received channels, but has a low number of outputs, typically four or eight outputs at present. That number may be increased by cascading a plurality of the above components in a tree structure, however. Hereinafter, a component of the above kind, or an assembly of components equivalent to a component having a greater number of outputs, is referred to as a wavelength selection module or, more simply, as a selection module.

The same module may also perform the converse function by exchanging the output and input roles. In this case, it becomes a component having a plurality of inputs and one output and is used to switch spectral channels (i.e. optical signals carried by respective wavelengths) received at respective inputs to the output of the module selectively as a function of the wavelengths of the channels received at the respective inputs and as a function of a command signal.

Of course, the spectral channels switched to the output must have different wavelengths. The module then has a programmable multiplexing function for providing at its output a channel selected from the channels received or an output multiplex consisting of a set of channels selected from the channels received.

SUMMARY OF THE INVENTION

To be more precise, the invention consists in an optical switching system comprising:
  input ports adapted to receive respective optical multiplex input signals each consisting of spectral channels carried by respective wavelengths,
  output ports, and
  a routing device adapted to switch the spectral channels received by a plurality of input ports selectively to respective output ports selected as a function of a command.

In the switching system of the invention, a wavelength selection module, hereinafter referred to as a selection module, being a device having one input and a plurality of outputs adapted to switch spectral channels received at its input selectively to respective outputs of the module as a function of their respective wavelengths and as a function of a command signal, the routing device comprises:
  a first stage comprising a plurality of selection modules whereof inputs constitute respective input ports of the switching system,
  a second stage comprising at least one first selection module whereof the outputs constitute respective output ports of the switching system, and
  an intermediate stage for coupling the input of the first selection module of the second stage both to a first output of a first selection module of the first stage and to a first output of a second selection module of the first stage.

This solution has the advantage of allowing flexibility in the assignment of usable wavelengths in at least two fibers whilst being of modular structure and therefore of limited cost at the start of operation. Moreover, because the transfers of signals between components of the device may be effected in each coupling link by sets of channels, the number of interconnections to be provided between components remains relatively low.

According to a first possibility of evolution, the second stage comprises a second selection module and the intermediate stage couples the input of the second selection module of the second stage both to a second output of the first selection module of the first stage and to a second output of the second selection module of the first stage.

In this variant, providing double coupling of the two selection modules of the first stage with two selection modules of the second stage increases the number of wavelengths that may be selectively assigned to the two fibers.

According to an embodiment enabling the device to support a greater total number of channels and therefore the introduction of additional wavelengths, the intermediate stage comprises first and second star couplers each having a plurality of inputs and a plurality of outputs and wherein:
  the first outputs of the first and second selection means of the first stage are coupled to two respective inputs of the first coupler,
  the second outputs of the first and second selection modules of the first stage are coupled to two respective inputs of the second coupler, and each output of each coupler is connected to an input of an associated selection module of the second stage.

In another embodiment at least two of the selection modules of the second stage associated with the same coupler are adapted to process separate bands of wavelengths.

This variant allows the use of wavelength selection modules each able to process bands of wavelengths that are narrower or less dense than the total band of wavelengths used in the network, which has a beneficial impact on their cost.

The device will generally be connected to any number n of input fibers. In this case it is advantageous if the first stage comprises at least n selection modules and the second stage comprises at least s selection modules, the intermediate stage comprises at least s star couplers each having at least n inputs and at least one output associated with one of the s selection modules of the second stage, and:

each output of each coupler is coupled to an input of an associated selection module of the second stage, and n inputs of each coupler are coupled to n respective outputs of n separate selection modules of the first stage, each of the outputs being coupled to an input of a single coupler.

The invention also consists in a switching system adapted to effect the converse operations, i.e. to receive input signals carried by respective wavelengths and to switch them selectively to respective output ports selected as a function of a command. The device therefore forms at its output ports multiplex signals each consisting of a selected combination of single-wavelength signals received at its input.

In this case, the structure of the device remains identical to the previous structure, but its mode of use is different: the direction of propagation of the signals is reversed, the output signals become input signals and vice-versa, the outputs or the output ports become the inputs or the input ports and vice-versa, and the second stage becomes the first stage and vice-versa.

To be more precise, the optical switching system comprises:

input ports adapted to receive respective optical input signals carried by respective wavelengths, output ports, a routing device adapted to switch the signals received by a plurality of input ports selectively to output ports selected as a function of a command, in which switching system a wavelength selection module, hereinafter referred to as a selection module, being a device having a plurality of inputs and one output and adapted to switch signals received at respective inputs to the output of the module selectively as a function of the wavelengths of the signals received and the respective inputs and as a function of a command signal, the routing device comprises:

a first stage comprising at least one first selection module or multiplexer whose inputs constitute input ports of the switching system, a second stage comprising a plurality of selection modules whose outputs constitute respective output ports of the switching system, and an intermediate stage for coupling the output of the first selection module of the first stage both to a first input of a first selection module of the second stage and to a first input of a second selection module of the second stage.

This embodiment has the same variants and evolution possibilities as the first embodiment. Those variants will not be described explicitly, given that they are deduced from the variants already described merely by exchanging the roles of the inputs and the outputs.

Optionally, all of the selection modules of the first stage (or even only a portion of them) may be replaced by simple multiplexers. This variant is beneficial if the possibility of modifying the send wavelengths of the senders TX can be dispensed with. In this case, it would be of no utility to provide selection modules whose specific functions would not be used. The choice of multiplexers is then preferable in particular because they induce less optical losses than the selection modules for a given number of input ports.

The invention also relates to a switching node for an optical transmission network in which an input patch panel, an optical-to-electrical conversion interface, an electronic switch, an electrical-to-optical conversion interface and an output patch panel are coupled in cascade. The input and/or output patch panel conform(s) to the above description.

The invention finally relates to an optical transmission network including at least one such switching node.

Other aspects and advantages of the invention will become apparent in the course of the description with reference to the figures.

BRIEF DESCRIPTION OF THE DRAWINGS

FIG. 1, already commented on, represents a prior art routing node.

FIG. 2 represents an optical switching system of the invention and its evolution from a minimum configuration.

FIG. 3 represents an optical switching system of the invention in an optimum configuration after upgrading.

DETAILED DESCRIPTION OF THE PREFERRED EMBODIMENT

FIG. 2 shows one example of the structure of the switching system of the invention. It may be used as an input or output patch panel. Given that these two options are distinguished only by opposite directions of propagation of the optical signals, the components of the structure will be referred to and their reference numbers specified essentially in relation to the input patch panel. For reasons of consistency with FIG. 1, certain elements relating to the output patch panel have reference numbers in parentheses.

How the switching system is adapted to evolve as a function of increasing requirements is explained next.

The present example considers that the device PP is connected initially only to two input fibers which carry respective multiplex input signals WM1, WM2 each consisting of spectral channels carried by respective wavelengths. The wavelengths usable in each of the fibers generally belong to a predefined standard comb of wavelengths. However, there are considered hereinafter only those supported by the device, i.e. by the selected selection module. However, this does not rule out the fibers being able to use other wavelengths, but they would then have to be processed by another and suitably adapted device.

A first stage 1 comprises two selection modules IWS1, IWS2 whose inputs constitute respective input ports A1, A2 of the switching system which receive the multiplex signals WM1, WM2, respectively.

A second stage 2 comprises selection modules CWS1, CWS2, CWS3, CWS4 whose outputs constitute respective output ports Q1, ... Qi, ... Qa of the switching system. In the application to an input patch panel, these output ports are coupled to respective receivers of an optical-to-electrical conversion interface RX previously mentioned.

An intermediate stage 3 shown diagrammatically here in the form of star couplers SC1, SC2 and optical links (no reference number) provides coupling between the inputs of the selection modules of the second stage and the outputs of the selection modules of the first stage.

To achieve flexibility in the assigning of wavelengths for carrying the channels conveyed by the fibers, there may already be present a single coupler, for example the coupler SC1, of which two inputs and one output are used, the two inputs being connected to a first output of the selection module IWS1 and to a first output of the selection module IWS2, respectively. The output of the coupler is connected to the input of the selection module CWS2. This couples the input of the module CWS2 both to an output of the module IWS1 and to an output of the module IWS2.

With this arrangement, and given the properties of the selection modules, any wavelength from each of the fibers may be directed to any output of the module CWS2 and therefore to any receiver. However, the number of wavelengths directed to the coupler must not exceed the number of outputs of the module CWS2. As a result of this, the remaining wavelengths for each fiber cannot be processed as resources exchangeable between fibers. These wavelengths may nevertheless be switched from other outputs of the selection modules IWS1, IWS2 of the first stage to dedicated receivers, either directly or via selection modules OWS1, OWS2 of the second stage, as shown in the figure (the connections shown in dotted line).

To alleviate the limitation on the number of wavelengths that may be exchanged, a first evolution of the device consists in providing in the second stage 2 a second selection module CWS3 and in the intermediate stage 3 a second coupler CS2. Thus the input of the second selection module CWS3 is coupled both to a second output of the module IWS1 and to a second output of the module IWS2 (the connections shown in dashed line with long dashes). If the modules CWS2 and CWS3 are identical, the number of wavelengths that can be exchanged is doubled.

Note that the selection modules IWS1, IWS2 must each be commanded to switch to the same coupler separate sets of wavelengths, although this does not constitute a limitation on the flexibility of assigning wavelengths to the fibers.

Given that the total number of channels that can be switched by the device is limited by the total number of outputs of the modules of the second stage 2 and that the number of outputs of a module is limited, a second type of evolution of the device increases the total number of channels if required, for example after additional wavelengths come into service. For this it suffices to install additional selection modules in the second stage, for example the modules CWS1, CWS4, and to provide star couplers SC1, SC2 each having a plurality of inputs and a plurality of outputs.

As before, the first outputs of the modules IWS1, IWS2 are coupled to two respective inputs of the first coupler SC1 and their second outputs are connected to two other inputs of the second coupler SC2. Furthermore, each output of each coupler is coupled to an input of an associated selection module of the second stage (the connections shown in dashed line with short dashes).

In this case, it is advantageous for the selection modules of the second stage associated with the same coupler to be adapted to process separate bands of wavelengths, typically adjacent bands of wavelengths or interleaved bands of wavelengths. This enables the use of modules of simpler design and thus of lower cost.

A third type of evolution of the device aims to take account of an increase in the number of input fibers. To this end, it suffices to install additional selection modules in the first stage and to couple its outputs appropriately to the inputs of the selection modules of the second stage. Additional selection modules can also be installed in the second stage to achieve the maximum flexibility.

This results in an optimum structure, as represented in FIG. 3 in the particular situation of three input fibers.

In the general case of n input fibers, the first stage comprises n modules (here three modules IWS1-IWS3), the second stage comprises s modules (here eight modules CWS1-CWS8). The intermediate stage includes k star couplers (here three couplers SC1, SC2, SC3) each having at least n inputs and at least one output associated with one of the selection modules of the second stage. Each output of each coupler is coupled to an input of an associated selection module of the second stage and n inputs of each coupler are coupled to n respective outputs of n separate selection modules of the first stage, each of those outputs being coupled to an input of only one coupler.

Of course, the number s of modules of the second stage to be provided and the number r of outputs of each coupler depend on the total number of channels to be processed and on the number of outputs thereof.

The dimensioning rules for an optimum structure in the situation in which the modules of the first stage each have p outputs and the modules of the second stage each have q outputs may be summarized as follows.

If c is the number of wavelengths used in the network, then:
c.n=s.q
k=p
k.r=s

In respect of the application of the device as an output patch panel PP', the same structure may be used simply by interchanging the roles of the inputs and the outputs and replacing the optical-to-electrical conversion interface RX with an electrical-to-optical conversion interface TX. The resulting change in the mode of use is obvious and it is therefore unnecessary to explain it in more detail.

However, as already mentioned, for this application the selection modules of the first stage may if necessary be replaced with simple multiplexers.

The invention claimed is:

1. An optical switching system comprising:
   input ports adapted to receive respective optical multiplex input signals each consisting of spectral channels carried by respective wavelengths,
   output ports, and
   a routing device adapted to switch the spectral channels received by a plurality of input ports selectively to respective output ports selected as a function of a command, wherein a selection module is a device having one input and a plurality of outputs, and is adapted to switch spectral channels received at its input selectively to respective outputs of said module as a function of their respective wavelengths and as a function of a command signal, and said routing device comprises:
   a first stage comprising a plurality of selection modules whose inputs constitute respective input ports of said switching system,
   a second stage comprising at least one first selection module whose outputs constitute respective output ports of said switching system, and
   an intermediate stage for coupling the input of said first selection module of said second stage both to a first output of a first selection module of said first stage and to a first output of a second selection module of said first stage.

2. The switching system according to claim 1, wherein said second stage comprises a second selection module and said intermediate stage couples the input of said second selection module of said second stage both to a second output of said first selection module of said first stage and to a second output of said second selection module of said first stage.

3. The switching system according to claim 2, wherein said intermediate stage comprises first and second star couplers each having a plurality of inputs and a plurality of outputs and wherein:

said first outputs of said first and second selection modules of said first stage are coupled to two respective inputs of said first coupler, said second outputs of said first and second selection modules of said first stage are coupled to two respective inputs of said second coupler, and each output of each coupler is connected to an input of an associated selection module of said second stage.

4. The switching system according to claim 3, wherein at least two of said selection modules of said second stage associated with the same coupler are adapted to process separate bands of wavelengths.

5. The switching system according to claim 1, wherein said first stage comprises at least n selection modules, said second stage comprises at least s selection modules, said intermediate stage comprises at least s star couplers each having at least n inputs and at least one output associated with one of said s selection modules of said second stage, and:

each output of each coupler is coupled to an input of an associated selection module of said second stage, and n inputs of each coupler are coupled to n respective outputs of n separate selection modules of said first stage, each of said outputs being coupled to an input of a single coupler.

6. A switching node for an optical transmission network in which an input patch panel, an optical-to-electrical conversion interface, an electronic switch, an electrical-to-optical conversion interface and an output patch panel are coupled in cascade, wherein said input patch panel comprises the optical switching system of claim 1.

7. An optical transmission network comprising at least one switching node of claim 6.

8. An optical switching system comprising:

input ports adapted to receive respective optical input signals carried by respective wavelengths, output ports, a routing device adapted to switch the signals received by a plurality of input ports selectively to output ports selected as a function of a command, wherein a selection module is a device having a plurality of inputs and one output, and is adapted to switch signals received at respective inputs to said output of said module selectively as a function of the wavelengths of the signals received at the respective inputs and as a function of a command signal, and said routing device comprises:

a first stage comprising at least one first selection module whose inputs constitute respective input ports of said switching system, a second stage comprising a plurality of selection modules whose outputs constitute respective output ports of said switching system, and an intermediate stage for coupling the output of said first selection module of said first stage both to a first input of a first selection module of said second stage and to a first input of a second selection module of said second stage, wherein:

said first stage comprises a second selection module or multiplexer and said intermediate stage couples the output of said second selection module or multiplexer of said first stage both to a second input of said first selection module of said second stage and to a second input of said second selection module of said second stage, said intermediate stage comprises first and second star couplers each having a plurality of inputs and a plurality of outputs, said first inputs of said first and second selection modules of said second stage are coupled to two respective outputs of said first coupler, said second inputs of said first and second selection modules of said second stage are coupled to two respective outputs of said second coupler, and each input of each coupler is coupled to an output of an associated selection module or multiplexer of said first stage.

9. The switching system according to claim 8, wherein at least two of said selection modules or multiplexers of said first stage associated with the same coupler are designed to process non-adjacent bands of wavelengths.

10. The switching system according to claim 8, wherein said second stage comprises at least n selection modules, said first stage comprises at least s selection modules or multiplexers, and said intermediate stage comprises at least s star couplers each having at least n outputs and at least one input associated with one of said s selection modules or multiplexers of said first stage, each input of each coupler is coupled to an output of a selection module or multiplexer associated with said first stage, and n outputs of each coupler are coupled to n respective inputs of n separate selection modules of said second stage, each of said inputs being coupled to an output of a single coupler.

11. A switching node for an optical transmission network in which an input patch panel, an optical-to-electrical conversion interface, an electronic switch, an electrical-to-optical conversion interface and an output patch panel are coupled in cascade, wherein said output patch panel comprises the optical switching system of claim 8.

* * * * *